United States Patent
Vu (10) Patent No.: US 10,049,029 B1
(45) Date of Patent: Aug. 14, 2018

(54) NETWORKED MULTI-INTERFACE HOST DEBUGGER

(71) Applicant: American Megatrends, Inc., Norcross, GA (US)

(72) Inventor: Hoang Ngoc Minh Vu, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 28 days.

(21) Appl. No.: 15/147,208

(22) Filed: May 5, 2016

(51) Int. Cl.
*G06F 11/36* (2006.01)

(52) U.S. Cl.
CPC .............................. *G06F 11/3656* (2013.01)

(58) Field of Classification Search
CPC ..... G06F 8/65–8/665; G06F 11/3656–11/3664
See application file for complete search history.

(56) References Cited

U.S. PATENT DOCUMENTS

| | | | | |
|---|---|---|---|---|
| 6,825,846 B2 * | 11/2004 | Mondal | ................... | H04L 29/06 345/2.1 |
| 7,543,277 B1 * | 6/2009 | Righi | ................... | G06F 11/362 709/221 |
| 7,861,119 B1 * | 12/2010 | Righi | ................... | G06F 11/366 714/25 |
| 8,069,371 B2 * | 11/2011 | Sengupta | ............ | G06F 11/0748 714/37 |
| 8,576,570 B2 * | 11/2013 | Nguyen | ................. | G06F 1/181 361/725 |
| 9,569,339 B1 * | 2/2017 | Villalobos | ........... | G06F 11/3644 |
| 2006/0218309 A1 * | 9/2006 | Young | ....................... | G06F 8/65 710/8 |
| 2013/0326278 A1 * | 12/2013 | Yin | ....................... | G06F 11/362 714/38.1 |
| 2016/0330094 A1 * | 11/2016 | Kniplitsch | ............ | H04L 9/3226 |
| 2017/0046228 A1 * | 2/2017 | Palayur | ............... | G06F 11/1415 |
| 2017/0131991 A1 * | 5/2017 | Su | ............................. | G06F 8/65 |

* cited by examiner

*Primary Examiner* — Joseph R Kudirka
(74) *Attorney, Agent, or Firm* — Newport IP, LLC | Shigeta & Hope (57) ABSTRACT

A debugger is provided that is capable of connecting internally or externally to a host device using one or more of multiple host interfaces. The debugger can also connect, over a network, to a remote communication device executing a debugging application. Through the debugger, the debugging application receives messages from the host device regarding the status of a firmware on the host device, and sends debugging commands to the host device for performing operations such as updating the firmware on the host device.

20 Claims, 4 Drawing Sheets

NETWORKED MULTI-INTERFACE HOST DEBUGGER

BACKGROUND

In many computing systems, low-level instruction code, or firmware, is used as an intermediary between the hardware components of the computing system and high-level software executing on the computing system, such as an operating system. The firmware provides a set of software routines that allow high-level software to interact with the hardware components of the computing system using standard calls.

The firmware of a computing system can be debugged by establishing a physical connection between a debugger and the computing system. Debuggers allow information related to the operation of firmware software routines to be observed. The observed information can be used to verify whether the firmware is operating correctly, and whether the firmware is compatible with a given hardware platform.

SUMMARY

A networked multi-interface host debugger is described herein. The networked multi-interface host debugger can use a network interface to connect, over a network, to a remote communication device. The networked multi-interface host debugger can have multiple host interfaces for connecting, internally or externally, to a host device.

Through the networked multi-interface host debugger, an application executed on the remote communication device can send debugging commands to and receive messages from the host device. By utilizing the debugging commands and messages, the networked multi-interface host debugger enables a user of the application on the remote communication device to update firmware on the host device and receive data such as errors, checkpoints, and failures regarding a status of the firmware operating on the host device.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to a networked multi-interface host debugger (which might be referred to as the "debugger"). The debugger can be internally or externally connected to a host device, and can allow the host device to be debugged via an application executing on a remote communication device connected over a network to the debugger. Accordingly, a user of the application can debug a firmware on the host device from a remote location via a network connection. The multiple host interfaces enable a single form factor to be manufactured for both the internal and external versions of the debugger with the difference between versions being the enclosure surrounding the debugger.

The debugger can further allow the user to remotely update the firmware on the host device and can allow errors, checkpoints, and failures of the firmware on the host device to be viewed remotely as they occur. The debugger can also provide other types of functionality, which are discussed in greater detail below.

In the following detailed description, references are made to the accompanying drawings that form a part hereof, and in which are shown by way of illustration specific configurations or examples. Referring now to the drawings, in which like numerals represent like elements throughout the several figures, aspects of an exemplary operating environment and the implementations provided herein will be described. The same reference numbers in different figures indicate similar or identical items.

Figure 1A:
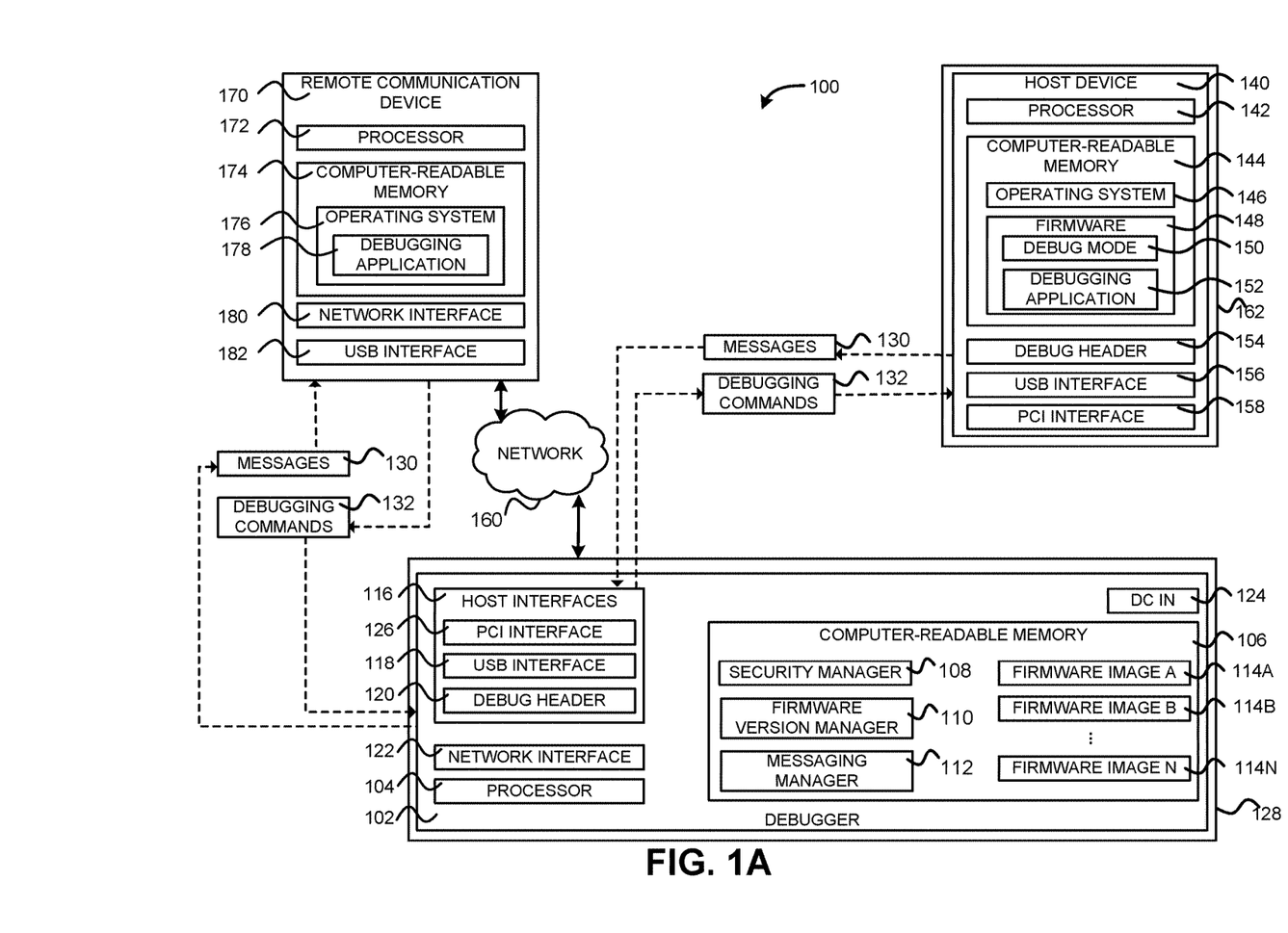
FIG. 1A is a block diagram depicting a debugging system that includes an externally connected networked multi-interface host debugger, according to some examples.

Turning now to FIG. 1A, a system 100 for an externally connected networked multi-interface host debugger, according to some examples, will be described. While the examples presented herein are described in the general context of hardware devices and program modules that operate in conjunction with the execution of a computer firmware, those skilled in the art will recognize that various examples can also be implemented in combination with other hardware devices and other types of program modules.

Generally, program modules include routines, programs, components, data structures, and other types of structures that perform particular tasks or implement particular abstract data types. Moreover, those skilled in the art will appreciate that the invention can be practiced with other computer system configurations, including hand-held devices, multi-processor systems, microprocessor-based or programmable consumer electronics, minicomputers, mainframe computers, embedded systems, and the like. Examples presented herein can also be practiced in distributed computing environments where tasks are performed by remote processing devices that are linked through a communications network. In a distributed computing environment, program modules can be located in both local and remote memory storage devices.

As shown in FIG. 1A, the system 100 includes a debugger 102. In an implementation, the debugger 102 contains a processor 104 and a computer-readable memory 106. The debugger 102 can also contain multiple host interfaces 116 for connecting to a host device 140. According to an implementation, the debugger 102 can contain interfaces for connecting to the host device 140 through connections that are external to the host device 140 and interfaces for connecting to the host device 140 through connections that are internal to the host device 140. For example, the debugger 102 can be connected externally to the host device 140 via a USB interface 118. As will be discussed in further detail with regard to FIG. 1B, the debugger 102 can be connected to the host device 140 through one or more connections, such as a debug header 120 or a Peripheral Component Interconnect ("PCI") interface 126 that are internal to the host device 140. The debugger 102 can send debugging commands 132 to the host device 140 and can receive messages 130 from the host device 140 via one of the host interfaces 116.

The debugger 102 can contain a network interface 122. By connecting the network interface 122 to a communications network ("network") 160, the debugger 102 can communicate with a remote communication device 170. In various examples, the network 160 can include a public network such as the Internet, a private network such as an institutional and/or personal intranet, or some combination of private and public networks. The network 160 can include any type of wired and/or wireless network, including, but not limited to, a local area network ("LAN"), wide area network ("WAN"), satellite network, cable network, Wi-Fi network, WiMax network, mobile communications network (e.g., 3G, 4G, LTE, etc.) or any combination thereof. The debugger 102 can receive debugging commands 132 from and send messages 130 to the remote communication device 170 via the network interface 122.

The computer-readable memory 106 of the debugger 102 can store data such as one or more firmware images (can be referred to collectively as "firmware images 114", and singularly as "firmware image 114", "firmware image 114A", "firmware image 114B", or "firmware image 114N"). In various implementations, the computer-readable memory 106 can also store additional data, such as security credentials and messages 130.

The computer-readable memory 106 can also store various software modules that can be executed on the processor 104. In some examples, the computer-readable memory 106 can store a security manager 108 module. The security manager 108 can control access to other modules and data stored on the debugger 102. For instance, the security manager 108 can receive login credentials from a user of the remote communication device 170. The user credentials can include a username, password, pin code, combinations of the above, or other authorization information.

The validity of the user credentials received from the remote communication device 170 can be determined by way of a comparison with user credentials stored on the computer-readable memory 106 of the debugger 102 (not shown). If the security manager 108 determines that the user credentials received from the remote communication device 170 match the security credentials stored on the computer-readable memory 106 of the debugger 102, the security manager 108 can provide access to the user of the remote communication device 170.

Upon determining that the security credentials received from the remote communication device 170 are valid, the security manager 108 can provide access to the user of the remote communication device 170 by allowing messages 130 and debugging commands 132 to be passed, by way of the debugger 102, between the remote communication device 170 and the host device 140. The security manager 108 can provide access to the user of the remote communication device 170 by enabling encryption and decryption of messages 130 and/or debugging commands 132 exchanged between the remote communication device 170 and the host device 140. In addition to controlling access to the modules and data stored on the computer-readable memory 106, the security manager 108 can monitor and record the number of users accessing the modules and data.

The computer-readable memory 106 can also store a firmware version manager 110 module. The firmware version manager 110 can be used to update a firmware 148 stored on the host device 140. In some implementations, the firmware version manager 110 can receive a debugging command 132 sent from the remote communication device 170. The debugging command 132 can be transmitted by the remote communication device 170 over the network and received via the network interface 122. In other implementations, the debugging command 132 can be transmitted by the remote communication device 170 over a Universal Serial Bus ("USB") cable and received via the USB interface 118.

The debugging command 132 transmitted by the remote communication device 170 can identify one of the firmware images 114 stored on the computer-readable memory 106. The debugging command 132 can contain instructions to update a firmware 148 on the host device 140 using the firmware image 114 identified in the debugging command 132. The firmware version manager 110 can transmit the debugging command 132 to the host device 140. A copy of the selected firmware image 114 can be attached to the debugging command 132.

The computer-readable memory 106 can contain a messaging manager 112 module. The messaging manager 112 can receive messages 130 from the host device 140. In some implementations, the messaging manager 112 can transmit the messages 130 to the remote communication device 170 as the messages 130 are received from the host device 140. In some implementations, the messaging manager 112 can store messages 130 received from the host device 140 for later transmission. For instance, the messaging manager 112 can transmit messages 130 stored in the computer-readable memory 106 in response to receiving a debugging command 132 from the remote communication device 170 that requests the messages 130. The messaging manager 112 can transmit the messages 130 stored in the computer-readable memory 106 as a group or can transmit subsets of the messages 130 stored in the computer-readable memory 106.

As discussed previously, the debugger 102 can be connected to the host device 140 via connections that are external to the host device 140. When connected externally, the debugger 102 can be contained within an enclosure 128 and the host device 140 contained within a separate enclosure 162. The enclosure 128 can provide apertures through which connections can be made between external devices and one or more of the USB interface 118, the debug header 120, and the network interface 122.

The enclosure 128 can contain an aperture through which a cable can be passed for connecting an electrical power source to the debugger 102. The electrical power source can be connected to a direct current ("DC") input (DC in) 124 on the debugger 102. In some configurations, the debugger 102 can be powered by the power supply of the host device 140 or the USB interface 156 of the host device 140. In this manner, the debugger 128 can be turned on or off using power provided by the host device 140. Similarly, the debugger 128 can be configured to turn on, turn off, or restart the host device 140 in various configurations presented herein.

The enclosure 128, which encases the debugger 102 can protect the sensitive electrical components of the debugger 102 and can reduce a risk of electric shock when the debugger 102 is physically manipulated. In various implementations, the separate enclosure 128 for the debugger 102 can be the only difference between a debugger 102 configured for external connection to the host device 140 and a debugger 102 configured for connecting internally to the host device 140. Accordingly, any differences in manufacturing costs related to internal versus external versions of the debugger configured for connections to the host device 140 can be limited to costs associated with the enclosure 128 for the debugger 102.

The system 100 for a networked multi-interface host debugger can include a host device 140. The host device 140 can contain a processor 142 and a computer-readable memory 144. The computer-readable memory 144 can include an operating system 146 and firmware 148. In some examples, the firmware 148 can include a debug mode 150 module. In some examples, the firmware 148 can include a debugging application 152 module.

The host device 140 can connect to the debugger 102 via one or more interfaces. For example, the host device 140 can connect to the debugger 102 via a USB interface 156. In other examples, the host device 140 can connect to the debugger 102 via a debug header 154, such as a 10-pin header. In still other implementations, the host device 140 can connect to the debugger 102 via a PCI interface 158, such as a PCI card connector. In some implementations, the host device 140 can connect to the debugger 102 through the debug header 154 and the PCI interface 158.

Through the connection to the debugger 102, the host device 140 can receive debugging commands 132 and can transmit messages 130. For instance, the host device 140 can receive a debugging command 132 containing instructions for initiating the debug mode 150 on the host device 140. In another example, the debugging command 132 can contain instructions for initiating communications between the debugging application 152 and the debugger 102.

In response to such debugging commands 132, the debugging application 152 can provide data related to the firmware 148 such as information on checkpoints. Checkpoints can indicate which particular operation among a number of operations in a boot process is currently executing. The generation of checkpoints can begin when power is provided to the host device 140 platform. As an alternative, the host device 140 can begin generating checkpoints when the host device 140 initiates the debug mode 150.

In response to receiving a debugging command 132 containing instructions for initiating communications between the debugging application 152 and the debugger 102, the debugging application 152 can also provide status messages 130. Status messages 130 can provide information on the status of the memory, processor 142, or the current checkpoint. Status messages 130 can provide information on the transfer of control from the firmware 148 to the operating system 146. Status messages 130 can also contain error messages related to the operation of the firmware 148 or system components of the host device 140. In some implementations, the debugging application 152 can provide additional executable instructions to enable communications with the debugger 102 over the USB interface 156.

The debugging application 152 can enable operations on the firmware 148 in response to instructions contained in a debugging command 132. In one instance, the debugging command 132 can contain instructions for updating the firmware 148 on the host device 140. The debugging command 132 can be received from the debugger 102 through the USB interface 156. In other implementations, the debugging command 132 can be received through the debug header 154.

The debugging application 152, when executing on the processor 142, can enable the firmware 148 of the host device 140 to be updated by replacing the current firmware 148 stored on the host device 140 with the firmware image 114 from the debugger 102 as identified by the debugging command 132. For instance, the debugging application 152 can contain executable instructions for invoking protocols and drivers necessary for updating the firmware 148 through the USB interface 156. In an implementation, the firmware 148 can be updated by updating the computer-readable memory 144 on which the firmware 148 is stored.

The system 100 for a networked multi-interface host debugger can include a remote communication device 170. The remote communication device 170 can contain a processor and a computer-readable memory 174. The computer-readable memory 174 can include an operating system 176 which, when executed by the processor, can provide an environment in which applications can run. As an example, the operating system 176 can manage the execution of a debugging application 178.

The remote communication device 170 can contain a network interface 180. When attached to a network by way of the network interface 180, the remote communication device 170 can communicate with other computing systems through the network. In some examples, the remote communication device 170 can communicate with a debugger 102 through the network.

The remote communication device 170 can contain a USB interface 182. The USB interface 182, when attached to a USB cable, can allow the remote communication device 170 to communicate through the USB cable with another computing system. In various implementations, the remote communication device 170 can be in communication, via the USB interface 182, with a debugger 102.

The remote communication device 170 can exchange information with the debugger 102 and/or the host device 140. For example, the remote communication device 170 can receive messages 130 directly from the debugger 102 or indirectly from the host device 140 by way of the debugger 102. In various instances, the messages 130 can contain status messages 130 generated on the host device 140. In alternative instances, the messages 130 can contain data stored or generated on the debugger 102, such as stored status messages 130 from the host device 140 or a listing of firmware images 114 stored on the debugger 102.

The remote communication device 170 can send debugging commands 132 directly to the debugger 102 or indirectly to the host device 140 by way of the debugger 102. In some implementations, a debugging command 132 can contain instructions for initiating the debug mode 150 on the host device 140. In another example, a debugging command 132 can contain instructions for updating firmware 148 stored on the host device 140 by replacing the firmware 148 of the host device 140 with a firmware image 114 selected from the debugger 102. In yet another example, a debugging command 132 can contain a request to the debugger 102 or the host device 140 for status messages 130.

The debugging application 178 stored on the remote communication device 170 can present a user interface allowing a user of the remote communication device 170 to interact with the debugging application 178. Through the user interface, a user can view and select firmware images 114 stored on the debugger 102. The user interface can allow the user to send instructions, via debugging commands 132, to the debugger 102 or the host device 140. The user interface can allow the user to view messages 130 received from the debugger 102 or the host device 140.

Figure 1B:
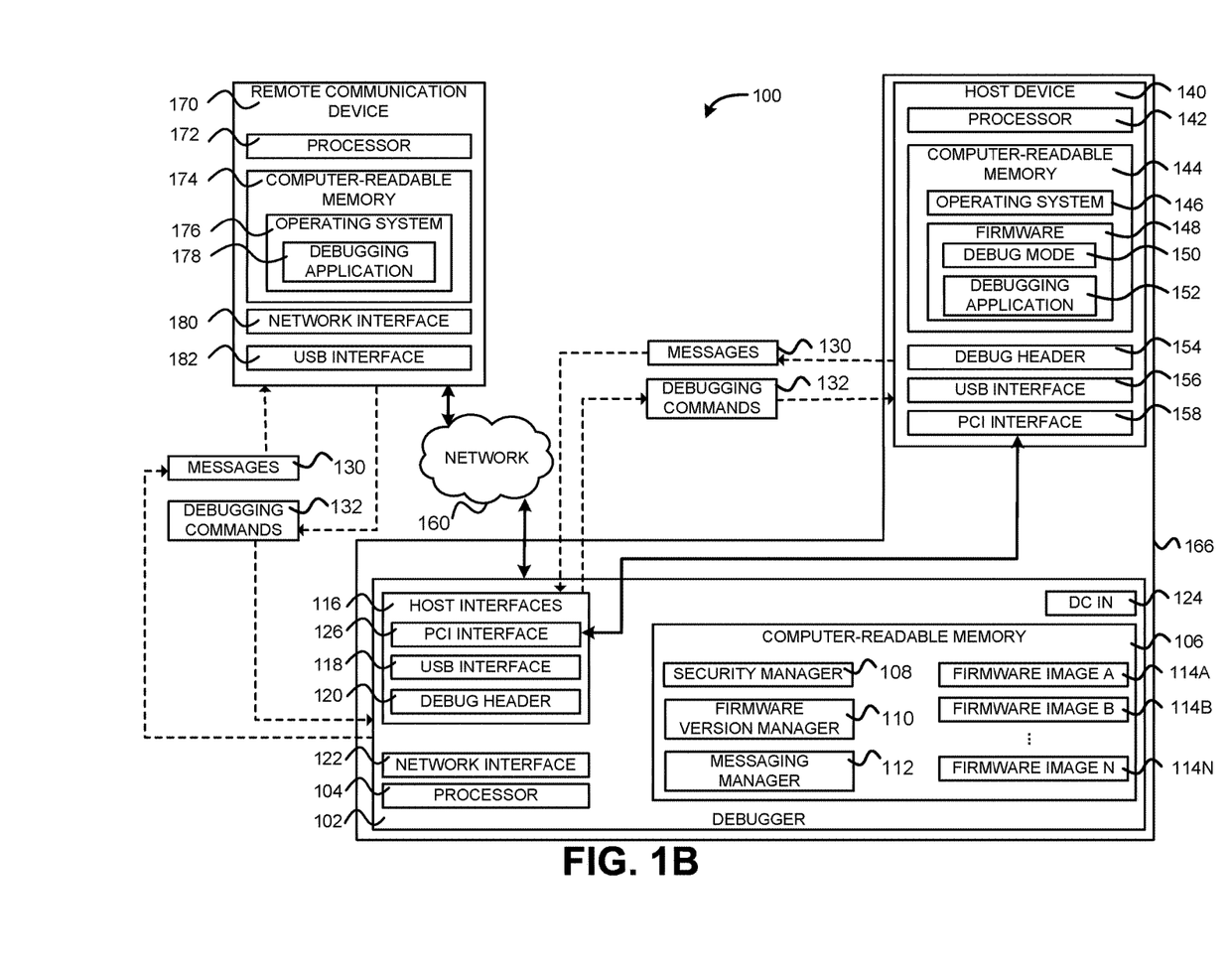
FIG. 1B is a block diagram depicting a debugging system that includes an internally connected networked multi-interface host debugger, according to some examples.

Referring now to FIG. 1B, a system 101 for an internally connected networked multi-interface host debugger, according to some examples, will be described. When internally connected, the debugger 102 and the host device 140 can share a common enclosure 166. The debugger 102 can be internally connected to the host device 140 via one of the host interfaces 116 described with regard to FIG. 1A. For example, the PCI interface 126 of the debugger 102 can be connected to the PCI interface 158 of the host device 140. In some instances, the debug header 120 of the debugger 102 is also connected to the debug header 154 of the host device 140. In other examples, the debugger 102 can be connected to the host device 140 through multiple connections such as through the debug header 154 and through the PCI interface 158. Through the PCI interface 126, the debugger 102 can have access to a greater level of information about the chipset of the host device 140 than is available when the debugger 102 is connected to the host device 140 through the USB and/or debug header 120.

In various implementations of an internally connected debugger 102, the debugger 102 can share a common enclosure 166 that contains the debugger 102 and the host device 140. When connected internally to the host device 140, the debugger 102 can receive power through the PCI interface 126. The common enclosure 166 can include one or more apertures aligned such that, when the debugger 102 is connected internally to the host device 140, the apertures allow physical connections to be made to the interfaces of the debugger 102. For example, an aperture can provide an opening so that a USB cable can be connected to the USB interface 118. In another instance, an aperture can provide an opening so that a connection to a network, such as an RJ45 cable, can be connected to the network interface 122. In other instances, a debugger 102 configured to communicate with a network over WI-FI can establish the wireless connection without a need for such an aperture.

Figure 2:
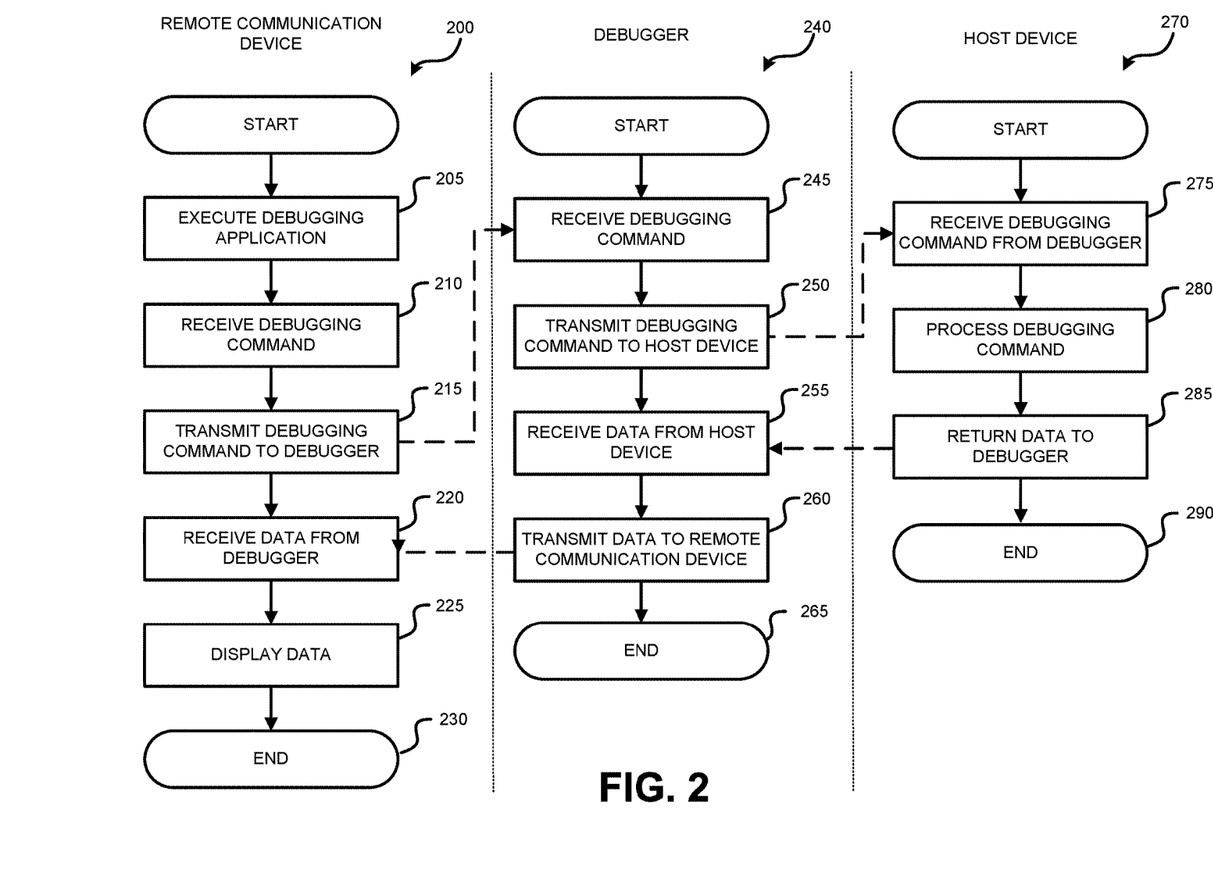
FIG. 2 is a set of flow diagrams illustrating example processes for remote debugging using the networked multi-interface host debugger disclosed herein in one particular configuration.

Turning now to FIG. 2, flow diagrams showing aspects of illustrative processes for remote debugging using a networked multi-interface host debugger will be described. It should be appreciated that the logical operations described herein with respect to FIG. 2 and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

In an implementation, the processes can begin on the remote communication device 170 with a remote invocation of debugging services 200. The remote invocation of debugging services begins with executing a debugging application 178 stored on the remote communication device 170. In some implementations, executing the debugging application 178 can include presenting a user interface that allows a user of the remote communication device 170 to interact with the debugging application 178. The debugging application 178 can be invoked by typing a text command, clicking on an icon, selecting an option from a menu, or other known mechanisms for invoking computer applications.

The process 200 can then move from operation 205 to operation 210, where the debugging application 178 executing on the remote communication device 170 receives a debugging command 132. The debugging application 178 can receive the debugging command 132 from the user interface. In various examples, the debugging command 132 can contain a request for data. In some other examples, the debugging command 132 can contain instructions to be executed on the debugger 102 or the host device 140.

From operation 210, the process can move to operation 215 where the debugging application 178 of the remote communication device 170 transmits the debugging command 132 to the debugger 102. In some implementations, the debugging command 132 can be transmitted over a network connection such as a LAN or WI-FI and received via the network interface 122 of the debugger 102. In other examples, the debugging command 132 can be transmitted over a USB cable to the USB interface 118 of the debugger 102.

From operation 215, the process 200 can invoke operation 245. At operation 245, the debugger 102 can receive the debugging command 132 from the remote communication device 170 by way of the network interface 122. In some instances, the debugging command 132 can be received from the remote communication device 170 through the USB interface 118.

The debugger 102 can examine the debugging command 132 to determine whether actions need to be taken by the debugger 102. For instance, the debugging command 132 can include instructions for authenticating a user of the remote communication device 170. The debugger 102 can employ a security manager 108 to compare login credentials included with the debugging command 132 against login credentials stored on the computer-readable memory 106 of the debugger 102. If the security manager 108 determines that the user-supplied credentials are valid, the security manager 108 can provide the user with access to the debugger 102 and the host device 140.

In some examples, providing the user with access to the debugger 102 can include providing the user with encryption and decryption services for messages 130 and debugging commands 132. In other examples, providing a user with access can include allowing debugging commands 132 to be passed from the remote communication device 170 to the host device 140 and allowing messages 130 to be passed from the host device 140 to the remote communication device 170. In addition to allowing access to a user, in some implementations, the security manager 108 can monitor and record the number of users to whom access has been provided.

The process 240 can move from operation 245 to operation 250 where the debugger 102 transmits the debugging command 132 to the host device 140. The debugging command 132 can be transmitted via a connection external to the host device 140, such as the USB interface 118, or via an internal connection, such as the PCI interface 126. The debugging command 132 can also be transmitted to the host device 140 using a debug header 120.

From operation 250, the process 240 on the debugger 102 can invoke operation 275 on the host device 140 where the host device 140 receives the debugging command 132 from the debugger 102. The debugging command 132 can be received via the USB interface 156, the debug header 154, or the PCI interface 158. The debugging command 132 can contain instructions to be executed on the host device 140. Once the debugging command 132 has been received, the process 270 can move from operation 275 to operation 280 where the host device 140 processes the debugging command 132 by executing various tasks on the host device 140.

In some instances, the host device 140 can process a debugging command 132 by initiating a debug mode 150 on the host device 140. In some implementations, the host device 140 can initiate communications with the remote communication device 170 through the debugging application 152. In other examples, the host device 140 can transmit information regarding checkpoints and status messages 130. A host device 140 can process a debugging command 132 by updating the firmware 148 of the host device 140 using a firmware image 114 selected from the debugger 102 and transmitted as part of the debugging command 132.

The process 270 can continue to operation 285 where the host device 140 returns data to the debugger 102. In some instances, the data can contain status messages 130 providing information on the status of the memory or processor 142. In other examples, the data can contain status messages 130 related to the firmware 148, such as information on the current checkpoint, the transfer of control from the firmware 148 to the operating system 146, or errors in the operation of the firmware 148 or system components of the host device 140.

As the host device 140 returns data to the debugger 102 in operation 285, the process 270 on the host device 140 can end. The control flow can then move to operation 255 where the debugger 102 receives data from the host device 140. The data can be received over a host interface 116, such as the debug header 120, PCI interface 126, or the USB interface 118.

In some instances, the debugger 102 can perform operations on the data, such as saving status messages 130 in the computer-readable memory 106. The stored status messages 130 can be retrieved by the remote communication device 170 at a later time via a request transmitted as a debugging command 132. The process 220 can move from operation 255 to operation 260 where the debugger 102 transmits the data to the remote communication device 170.

The process 240 executing on the debugger 102 can end, and the control flow can move to operation 220 where the remote communication device 170 receives the data from the debugger 102. The data can be received by the remote communication device 170 through the USB interface 182, or through the network interface 180.

The process 200 can move from operation 220 to operation 225 where the remote communication device 170 displays the data. The data can be displayed by the user interface of the debugging application 178. The process 200 can move from operation 225 to operation 230 where the process 200 ends.

Figure 3:
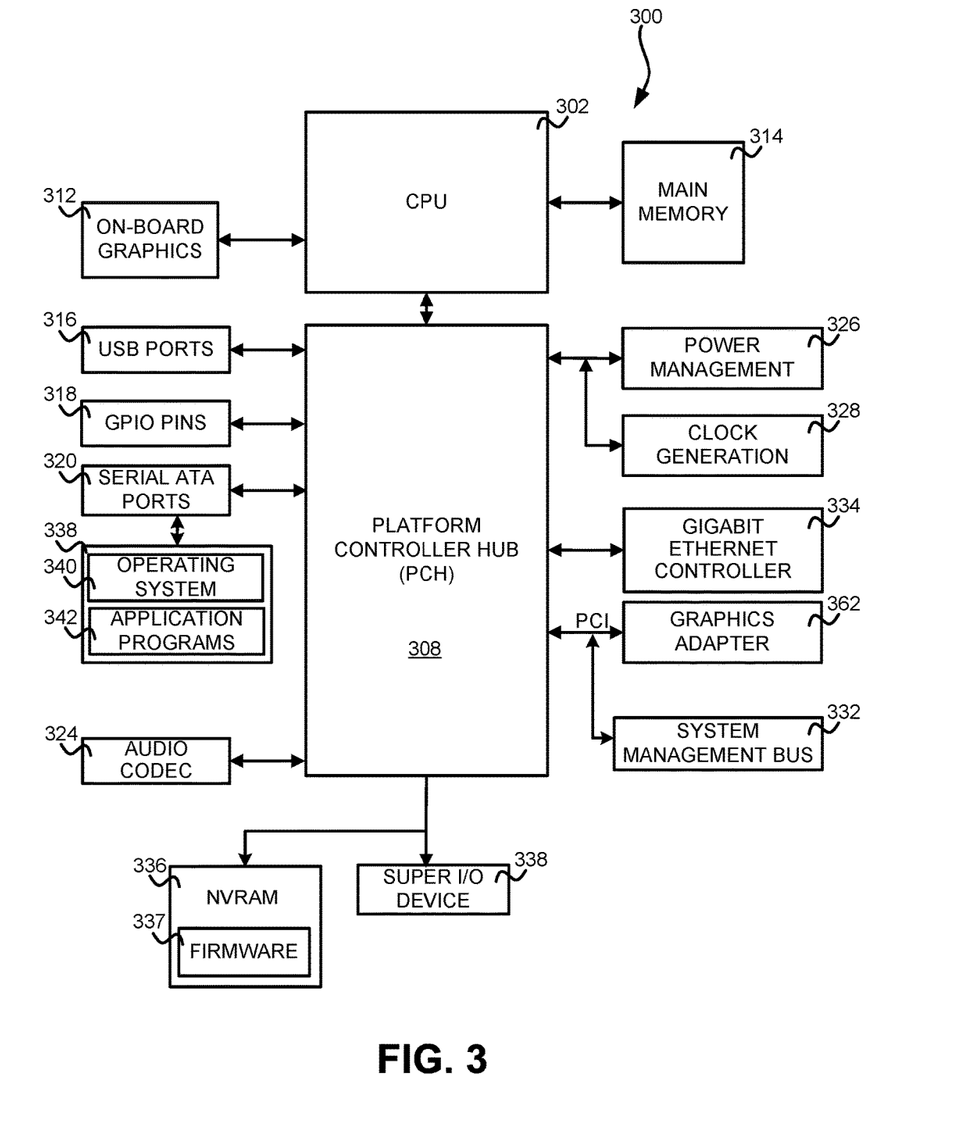
FIG. 3 is a block diagram depicting an illustrative computer architecture suitable for implementing a remote communication device or a host device suitable for use with the networked multi-interface host debugger disclosed herein, according to some examples.

Moving now to FIG. 3, an illustrative computer architecture for a computing system 300 suitable for implementing a remote communication device 170 or the host device 140 will be described. The computing system 300 can include a baseboard, or "motherboard," which can be a printed circuit board to which a multitude of components or devices can be connected by way of a system bus or other electrical communication path. In one illustrative configuration, a central processing unit ("CPU") 302 operates in conjunction with a Platform Controller Hub ("PCH") 308. The CPU 302 can be a standard central processor that performs arithmetic and logical operations necessary for the operation of the computing system 300. The computing system 300 can include a multitude of CPUs 302. Each CPU 302 can include multiple processing cores.

The CPU 302 provides an interface to a random access memory ("RAM") used as the main memory 314 in the computing system 300 and, possibly, to an on-board graphics adapter 312. The PCH 308 can provide an interface between the CPU 302 and the remainder of the computing system 300.

The PCH 308 can also be responsible for controlling many of the input/output functions of the computing system 300. In particular, the PCH 308 can provide one or more universal serial bus ("USB") ports 316, an audio codec 324, a Gigabit Ethernet Controller 334, and one or more general purpose input/output ("GPIO") pins 318. The USB ports 316 can include USB 2.0 ports, USB 3.0 ports and USB 3.1 ports among other USB ports. The audio codec 324 can include Intel High Definition Audio, Audio Codec '97 ("AC '97") and Dolby TrueHD among others. Power management circuitry 326 and clock generation circuitry 328 can also be utilized through the PCH 308.

The PCH 308 can also include functionality for providing networking functionality through a Gigabit Ethernet Controller 334. The Gigabit Ethernet Controller 334 is capable of connecting the computing system 300 to another computing system via a network. Connections which can be made by the Gigabit Ethernet Controller 334 can include LAN or WAN connections. LAN and WAN networking environments are commonplace in offices, enterprise-wide computer networks, intranets, and the internet.

The PCH 308 can also provide a bus for interfacing peripheral card devices such as a graphics adapter 362. In one configuration, the bus comprises a PCI bus. The PCI bus can include a Peripheral Component Interconnect ("PCI") bus, a Peripheral Component Interconnect eXtended ("PCI-X") bus or a Peripheral Component Interconnect Express ("PCIe") bus among others. The PCH 308 can also provide a system management bus 332 for use in managing the various components of the computing system 300.

The PCH 308 is also configured to provide one or more interfaces for connecting mass storage devices to the computing system 300. For instance, according to a configuration, the PCH 308 includes a serial advanced technology attachment ("SATA") adapter for providing one or more serial ATA ports 320. The serial ATA ports 320 can be connected to one or more mass storage devices storing an operating system 340 and application programs 342, such as the SATA disk drive 338. As known to those skilled in the art, an operating system 340 comprises a set of programs that control operations of a computer and allocation of resources. An application program 342 is software that runs on top of the operating system 340 software, or other runtime environment, and uses computer resources to perform application specific tasks desired by the user. In an example, the application program 342 can be the debugging application 178 configured to communicate messages 130 and debugging commands 132 to a separate computing device.

According to one configuration, the operating system 340 comprises the LINUX operating system. According to another configuration of the invention the operating system 340 comprises a version of the WINDOWS operating system from MICROSOFT CORPORATION. According to other configurations, the operating system 340 can comprise the UNIX, or OSX operating system. It should be appreciated that other operating systems can also be utilized.

The mass storage devices connected to the PCH 308, and their associated computer-readable storage media, provide non-volatile storage for the computing system 300. Although the description of computer-readable storage media contained herein refers to a mass storage device, such as a hard disk or CD-ROM drive, it should be appreciated by those skilled in the art that computer-readable storage media can be any available media that can be accessed by the computing system 300.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium that can be used to store the desired information in a non-transitory fashion, and which can be accessed by the computing system 300.

A low pin count ("LPC") interface can also be provided by the PCH 308 for connecting a Super I/O device 338. The Super I/O device 338 is responsible for providing a number of input/output ports, including a keyboard port, a mouse port, a serial interface, a parallel port, and other types of input/output ports. The LPC interface can also connect a computer storage media such as a ROM or a flash memory such as a non-volatile random access memory ("NVRAM") 336 for storing the firmware 337 that includes program code containing the basic routines that help to start up the computing system 300 and to transfer information between elements within the computing system 300. Some examples of firmware 337 include Basic Input/Output System ("BIOS"), firmware that is compatible with the Unified Extensible Firmware Interface ("UEFI"), or Open Firmware among others.

It should be appreciated that the program modules disclosed herein, including the firmware 337, can include software instructions that, when loaded into the CPU 302 and executed, transform a general-purpose computing system into a special-purpose computing system customized to facilitate all, or part of, the operations disclosed herein. As detailed throughout this description, the program modules can provide various tools or techniques by which the computing system 300 can participate within the overall systems or operating environments using the components, logic flows, and/or data structures discussed herein. According to an implementation, the firmware 337 can include modules such as the debugging application 152.

The CPU 302 can be constructed from any number of transistors or other circuit elements, which can individually or collectively assume any number of states. More specifically, the CPU 302 can operate as a state machine or finite-state machine. Such a machine can be transformed to a second machine, or a specific machine, by loading executable instructions contained within the program modules. These computer-executable instructions can transform the CPU 302 by specifying how the CPU 302 transitions between states, thereby transforming the transistors or other circuit elements constituting the CPU 302 from a first machine to a second machine, wherein the second machine can be specifically configured to perform the operations disclosed herein. The states of either machine can also be transformed by receiving input from one or more user input devices, network interfaces (such as the gigabit Ethernet controller 334), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor memory 314 and 336 when the software or firmware 337 is encoded therein. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the computing system 300 can comprise other types of computing devices, including hand-held computers, embedded computer systems, personal digital assistants, and other types of computing devices known to those skilled in the art. It is also contemplated that the computing system 300 may not include all of the components shown in FIG. 3, can include other components that are not explicitly shown in FIG. 3, or can utilize an architecture completely different than that shown in FIG. 3.

Although the subject matter has been described in language specific to structural features and/or methodological acts, it is to be understood that the subject matter defined in the appended claims is not necessarily limited to the specific features or acts described. Rather, the specific features and operations are disclosed as example forms of implementing the claims.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "might" or "may," unless specifically stated otherwise, are understood within the context to present that certain examples include, while other examples do not include, certain features, elements and/or operations. Thus, such conditional language is not generally intended to imply that certain features, elements and/or operations are in any way required for one or more examples or that one or more examples necessarily include logic for deciding, with or without user input or prompting, whether certain features, elements and/or operations are included or are to be performed in any particular example. Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A multiple host interface debugger for connecting to a host computing device via a plurality of internal host interfaces and one or more external host interfaces, the debugger comprising:
   a network interface configured to receive a debugging command from a remote communication device, the network interface comprising one or more of a wired network interface, a wireless network interface, or a Universal Serial Bus (USB) interface;
   a plurality of internal host interfaces configured for connecting the debugger to the host computing device via connections of the host computing device located internal to an enclosure of the host computing device, the plurality of internal host interfaces comprising a debug header and a Peripheral Component Interconnect (PCI) interface;
   one or more external host interfaces configured for connecting the debugger to the host computing device via connections of the host device located external to the enclosure of the host computing device, the one or more external host interfaces comprising at least a USB interface;
   a processor; and
   a computer-readable medium with instructions stored thereon which, when executed by the processor, cause the apparatus to
      receive the debugging command from the remote communication device connected via the network interface,
      transmit the debugging command to the host device on one of the plurality of internal host interfaces if the debugger is configured to use one of the plurality of internal host interfaces for communicating with the host device, and
      transmit the debugging command to the host device on one of the one or more external host interfaces if the debugger is configured to use one of the one or more external host interfaces for communicating with the host device.

2. The multiple host interface debugger of claim 1, further comprising an enclosure containing the multiple host interface debugger, the enclosure comprising apertures for connecting to the one or more external host interfaces.

3. The multiple host interface debugger of claim 1, wherein the debug header and the PCI interface are configured for simultaneous connection to the host device.

4. The multiple host interface debugger of claim 1, wherein the PCI interface comprises a PCI card connector.

5. The multiple host interface debugger of claim 1, further comprising an enclosure containing the multiple host interface debugger, the enclosure comprising apertures for connecting to the plurality of internal host interfaces.

6. The multiple host interface debugger of claim 1, wherein the multiple host interface debugger is powered through the PCI interface.

7. The multiple host interface debugger of claim 1, wherein the multiple host interface debugger is configured to turn on, turn off, or restart the host device.

8. A multiple host interface debugger for connecting to a host computing device via one or more internal host interfaces and one or more external host interfaces, the debugger comprising:
   a network interface configured to receive a debugging command from a remote communication device, the network interface comprising one or more of a wired network interface, a wireless network interface, or a Universal Serial Bus (USB) interface;
   one or more internal host interfaces configured for connecting the debugger to the host computing device via connections of the host computing device located internal to an enclosure of the host computing device, the one or more internal host interfaces comprising a debug header or a Peripheral Component Interconnect (PCI) interface;
   one or more external host interfaces configured for connecting the debugger to the host computing device via connections of the host device located external to the enclosure of the host computing device, the one or more external host interfaces comprising at least a USB interface;
   a processor; and
   a computer-readable medium with instructions stored thereon which, when executed by the processor, cause the apparatus to
      receive the debugging command from the remote communication device connected via the network interface,
      transmit the debugging command to the host device on one of the one or more internal host interfaces if the debugger is configured to use one of the one or more internal host interfaces for communicating with the host device, and
      transmit the debugging command to the host device on one of the one or more external host interfaces if the debugger is configured to use one of the one or more external host interfaces for communicating with the host device.

9. The multiple host interface debugger of claim 8, further comprising an enclosure containing the multiple host interface debugger, the enclosure comprising apertures for connecting to the one or more external host interfaces.

10. The multiple host interface debugger of claim 8, wherein the debug header and the PCI interface are configured for simultaneous connection to the host device.

11. The multiple host interface debugger of claim 8, wherein the PCI interface comprises a PCI card connector.

12. The multiple host interface debugger of claim 8, further comprising an enclosure containing the multiple host interface debugger, the enclosure comprising apertures for connecting to the one or more internal host interfaces.

13. The multiple host interface debugger of claim 8, wherein the multiple host interface debugger is powered through the PCI interface.

14. The multiple host interface debugger of claim 8, wherein the multiple host interface debugger is configured to turn on, turn off, or restart the host device.

15. A multiple host interface debugger for connecting to a host computing device via one or more internal host interfaces and one or more external host interfaces, the debugger comprising:
- a network interface configured to receive a debugging command from a remote communication device;
- one or more internal host interfaces configured for connecting the debugger to the host computing device via connections of the host computing device located internal to an enclosure of the host computing device;
- one or more external host interfaces configured for connecting the debugger to the host computing device via connections of the host device located external to the enclosure of the host computing device;
- a processor; and
- a computer-readable medium with instructions stored thereon which, when executed by the processor, cause the apparatus to
  - receive the debugging command from the remote communication device connected via the network interface,
  - transmit the debugging command to the host device on one of the one or more internal host interfaces if the debugger is configured to use one of the one or more internal host interfaces for communicating with the host device, and
  - transmit the debugging command to the host device on one of the one or more external host interfaces if the debugger is configured to use one of the one or more external host interfaces for communicating with the host device.

16. The multiple host interface debugger of claim 15, further comprising an enclosure containing the multiple host interface debugger, the enclosure comprising apertures for connecting to the one or more external host interfaces.

17. The multiple host interface debugger of claim 15, wherein the one or more internal host interfaces comprises a debug header and a Peripheral Component Interconnect (PCI) interface, wherein the debug header and the PCI interface are configured for simultaneous connection to the host device.

18. The multiple host interface debugger of claim 17, wherein the PCI interface comprises a PCI card connector.

19. The multiple host interface debugger of claim 17, wherein the multiple host interface debugger is powered through the PCI interface.

20. The multiple host interface debugger of claim 15, further comprising an enclosure containing the multiple host interface debugger, the enclosure comprising apertures for connecting to the one or more internal host interfaces.

* * * * *